(12) United States Patent
Shechtman et al.

(10) Patent No.: US 8,619,098 B2
(45) Date of Patent: Dec. 31, 2013

(54) METHODS AND APPARATUSES FOR GENERATING CO-SALIENT THUMBNAILS FOR DIGITAL IMAGES

(75) Inventors: Elya Shechtman, Seattle, WA (US);
Daniel R. Goldman, Seattle, WA (US);
David E. Jacobs, Westlake Village, CA (US)

(73) Assignee: Adobe Systems Incorporated, San Jose, CA (US)

(*) Notice: Subject to any disclaimer, the term of this patent is extended or adjusted under 35 U.S.C. 154(b) by 563 days.

(21) Appl. No.: 12/868,519

(22) Filed: Aug. 25, 2010

(65) Prior Publication Data
US 2013/0120438 A1    May 16, 2013

Related U.S. Application Data

(60) Provisional application No. 61/243,932, filed on Sep. 18, 2009.

(51) Int. Cl.
*G09G 5/02* (2006.01)
*G09G 5/14* (2006.01)

(52) U.S. Cl.
CPC ........................... *G09G 5/14* (2013.01)
USPC ............ 345/635; 345/629; 345/204; 345/2.1; 345/156; 345/168; 345/2.2; 345/1.3; 345/1.1; 345/173; 345/169

(58) Field of Classification Search
CPC ............... G09G 5/14; G09G 2340/12; G09G 2320/0626; G09G 2320/0686; G09G 2320/08; G09G 2320/10; G09G 2340/0407; G09G 2340/0464; G09G 2340/06; G09G 2370/045; G09G 2370/24; G09G 5/003; G09G 5/10
USPC .......... 345/634, 629, 204, 2.1, 156, 168, 173, 345/589, 619, 632, 633
See application file for complete search history.

(56) References Cited

U.S. PATENT DOCUMENTS

| | | |
|---|---|---|
| 4,524,454 A | 6/1985 | Ejiri |
| 4,851,984 A | 7/1989 | Doi et al. |
| 5,764,237 A | 6/1998 | Kaneko |
| 5,867,166 A | 2/1999 | Myhrvold et al. |

(Continued)

OTHER PUBLICATIONS

MobiPicture: browsing pictures on mobile devices; Ming-Yu Wang, Xing Xie, Wei-Ying Ma, Hong-Jiang Zhang Nov. 2003.*

(Continued)

*Primary Examiner* — Javid A Amini
(74) *Attorney, Agent, or Firm* — Wolfe-SBMC

(57) ABSTRACT

Methods and apparatus for generating context-sensitive, co-salient thumbnails are described. Co-salient thumbnails may effectively convey more useful information than conventional thumbnails while using the same or similar display space. As such, co-salient thumbnails may make it easier for a user to locate a particular image in a large collection of similar images. In some embodiments, for each of a plurality of patches in a first image, an illustrative method may identify a corresponding similar patch in a second image based on one or more similarity measures. The method may then determine a distance from each of the plurality of patches to its corresponding similar patch and select a crop in the first image relative to the second image based on the determined distance. Optionally, the method may repeat these operations in the opposite direction to select a crop in the second image relative to the first image.

22 Claims, 11 Drawing Sheets

(56) References Cited

U.S. PATENT DOCUMENTS

| | | | |
|---|---|---|---|
| 5,870,097 A | 2/1999 | Snyder et al. | |
| 5,999,194 A | 12/1999 | Brunelle | |
| 6,177,927 B1 | 1/2001 | Chery et al. | |
| 6,262,745 B1 | 7/2001 | Perani | |
| 6,272,178 B1 | 8/2001 | Nieweglowski et al. | |
| 6,314,209 B1 | 11/2001 | Kweon et al. | |
| 6,348,924 B1 | 2/2002 | Brinsmead | |
| 6,453,069 B1 | 9/2002 | Matsugu et al. | |
| 6,636,644 B1 | 10/2003 | Itokawa | |
| 6,687,411 B1 | 2/2004 | Miura et al. | |
| 6,762,769 B2* | 7/2004 | Guo et al. | 345/582 |
| 6,919,903 B2 | 7/2005 | Freeman et al. | |
| 6,920,610 B1* | 7/2005 | Lawton et al. | 715/209 |
| 6,931,600 B1* | 8/2005 | Pittman | 715/767 |
| 6,937,275 B2 | 8/2005 | Heiles | |
| 6,964,025 B2 | 11/2005 | Angiulo et al. | |
| 6,987,535 B1 | 1/2006 | Matsugu et al. | |
| 7,012,624 B2* | 3/2006 | Zhu et al. | 345/639 |
| 7,034,848 B2* | 4/2006 | Sobol | 345/620 |
| 7,069,506 B2 | 6/2006 | Rosenholtz et al. | |
| 7,136,072 B2 | 11/2006 | Ritter et al. | |
| 7,176,908 B2* | 2/2007 | Matsubara et al. | 345/204 |
| 7,239,314 B2 | 7/2007 | Johnston | |
| 7,257,261 B2 | 8/2007 | Suh | |
| 7,283,140 B2 | 10/2007 | Zhou et al. | |
| 7,342,586 B2 | 3/2008 | Jaeger | |
| 7,418,673 B2 | 8/2008 | Oh | |
| 7,479,963 B2 | 1/2009 | Lischinski et al. | |
| 7,576,756 B1* | 8/2009 | Good et al. | 345/635 |
| 7,577,313 B1* | 8/2009 | Georgiev | 382/284 |
| 7,596,751 B2* | 9/2009 | Rowson et al. | 715/255 |
| 7,639,268 B2* | 12/2009 | Tsunoda | 345/635 |
| 7,737,977 B2 | 6/2010 | Grassia et al. | |
| 8,179,384 B2* | 5/2012 | Sakashita et al. | 345/204 |
| 8,249,365 B1 | 8/2012 | Winnemoeller et al. | |
| 8,280,703 B1 | 10/2012 | Mech | |
| 2003/0090487 A1 | 5/2003 | Dawson-Scully | |
| 2004/0114814 A1 | 6/2004 | Boliek et al. | |
| 2004/0155879 A1 | 8/2004 | Mittring | |
| 2005/0188304 A1* | 8/2005 | Lawton et al. | 715/526 |
| 2005/0243089 A1 | 11/2005 | Johnston | |
| 2006/0026524 A1* | 2/2006 | Ma et al. | 715/713 |
| 2006/0072847 A1* | 4/2006 | Chor et al. | 382/282 |
| 2006/0085743 A1 | 4/2006 | Baudisch et al. | |
| 2006/0267958 A1 | 11/2006 | Kolmykov-Zotov et al. | |
| 2007/0047012 A1* | 3/2007 | Bryant | 358/403 |
| 2007/0098266 A1* | 5/2007 | Chiu et al. | 382/224 |
| 2008/0086688 A1 | 4/2008 | Chandratillake et al. | |
| 2008/0117214 A1 | 5/2008 | Perani et al. | |
| 2008/0152201 A1* | 6/2008 | Zhang et al. | 382/118 |
| 2008/0235207 A1 | 9/2008 | Berkner et al. | |
| 2008/0235585 A1 | 9/2008 | Hart et al. | |
| 2008/0309662 A1 | 12/2008 | Hassner et al. | |
| 2009/0058871 A1 | 3/2009 | Mech et al. | |
| 2009/0208118 A1* | 8/2009 | Csurka | 382/228 |
| 2009/0276408 A1 | 11/2009 | Auerbach et al. | |
| 2010/0066874 A1 | 3/2010 | Ishiga | |
| 2010/0110068 A1 | 5/2010 | Yamauchi et al. | |
| 2010/0226564 A1* | 9/2010 | Marchesotti et al. | 382/159 |
| 2010/0251121 A1* | 9/2010 | Rosser et al. | 715/720 |
| 2011/0016112 A1 | 1/2011 | Yu | |
| 2011/0064388 A1 | 3/2011 | Brown et al. | |
| 2011/0066706 A1 | 3/2011 | Ostrover et al. | |
| 2012/0133817 A1 | 5/2012 | Anderson | |
| 2013/0051685 A1 | 2/2013 | Shechtman et al. | |
| 2013/0120454 A1 | 5/2013 | Shechtman et al. | |
| 2013/0121608 A1 | 5/2013 | Winnemoeller | |
| 2013/0121613 A1 | 5/2013 | Winnemoeller | |

OTHER PUBLICATIONS

Whyte, O., Sivic, J., and Zisserman, A. 2009. Get out of my picture! internet-based inpainting. In BMVC (British Machine Vision Conference), 11 pages.

U.S. Appl. No. 12/868,540, filed Aug. 25, 2010, Elya Shechtman, et al.

U.S. Appl. No. 12/857,294, filed Aug. 16, 2010, Dan Goldman, et al.

P. Bhat, B. Curless, M. Cohen, and C. L. Zitnick. Fourier analysis of the 2d screened poisson equation for gradient domain problems. In ECCV, 2008, 14 pages.

U.S. Appl. No. 12/394,280, filed Feb. 27, 2009, Dan Goldman, et al.

Yonatan Wexler, Eli Shechtman, Michel Irani. Space-Time Completion of Video. IEEE Transactions on Pattern Analysis and Machine Intelligence, vol. 29, No. 3, Mar. 2007, 14 pages.

Agarwala, A., Dontcheva, M., Agrawala, M., Drucker, S., Colburn, A., Curless, B., Salesin, D., and Cohen, M. 2004. Interactive digital photomontage. In ACM SIGGRAPH, vol. 23, 294-302.

Arias, P., Facciolo, G., Caselles, V., and Sapiro, G. 2011. A variational framework for exemplar-based image inpainting. IJCV 93 (July), 319-347.

U.S. Appl. No. 12/315,038, filed Nov. 26, 2008, Dan Goldman, et al.

Burt, P. J., and Adelson, E. H. 1983. A multiresolution spline with application to image mosaics. ACM Trans. Graphics 2 (October), 217-236.

Efros, A. A., and Leung, T. K. 1999. Texture synthesis by non-parametric sampling. IEEE Computer Society, Los Alamitos, CA, USA, 6 pages.

Fang, H., and Hart, J. C. 2007. Detail preserving shape deformation in image editing. In ACM SIGGRAPH, vol. 26, pp. 1-5.

Hays, J., and Efros, A. A. 2007. Scene completion using millions of photographs. In ACM SIGGRAPH, vol. 26, 4:1-4: 7 pages.

Kwatra, V., Essa, I., Bobick, A., and Kwatra, N. 2005. Texture optimization for example-based synthesis. In ACM SIGGRAPH, vol. 24, 795-802.

Kwatra, V., Schödl, A., Essa, I., Turk, G., and Bobick, A. 2003. Graphcut textures: image and video synthesis using graph cuts. In ACM SIGGRAPH, vol. 22, 277-286.

Perez, P., Gangnet, M., and Blake, A. 2003. Poisson image editing. In ACM SIGGRAPH, vol. 22, 313-318.

Rother, C., Bordeaux, L., Hamadi, Y., and Blake, A. 2006. AutoCollage. In ACM SIGGRAPH, vol. 25, 847-852.

Simakov, D., Caspi, Y., Shechtman, E., and Irani, M. 2008. Summarizing visual data using bidirectional similarity. In CVPR, 8 pages.

Szeliski, R., and Shum, H.-Y. 1997. Creating full view panoramic image mosaics and environment maps. In ACM SIGGRAPH, 251-258.

Tappen, M., Freeman, W., and Adelson, E. 2005. Recovering intrinsic images from a single image. IEEE Trans. PAMI 27, 9 (Sep.), 1459-1472.

Wei, L. Y., and Levoy, M. 2000. Fast texture synthesis using tree-structured vector quantization. In ACM SIGGRAPH, 479-488.

U.S. Appl. No. 12/858,546, filed Aug. 18, 2010, Holger Winnemoeller, et al.

U.S. Appl. No. 13/565,552, filed Aug. 2, 2012, Elya Shechtman, et al.

U.S. Appl. No. 12/858,558, filed Aug. 18, 2010, Holger Winnemoeller, et al.

Kajiya, J. T. and Kay, T. L. 1989. Rendering fur with three dimensional textures. SIGGRAPH Comput. Graph. 23, 3 (Jul. 1989), 271-280.

Marschner, S. R., Jensen, H. W., Cammarano, M., Worley, S., and Hanrahan, P. 2003. Light scattering from human hair fibers. In ACM SIGGRAPH 2003 Papers (San Diego, California, Jul. 27-31, 2003). SIGGRAPH '03. ACM, New York, NY, 780-791.

Chen, H. and Zhu, S. 2006. A Generative Sketch Model for Human Hair Analysis and Synthesis. IEEE Trans. Pattern Anal. Mach. Intell. 28, 7 (Jul. 2006), 1025-1040.

H. Chen and S. C. Zhu, "A generative model of human hair for hair sketching", CVPR (IEEE Conference on Computer Vision on and Pattern Recognition), 2:74-81, 2005.

David J. Heeger and James R. Bergen. Pyramid-based texture analysis/synthesis. In SIGGRAPH 95, pp. 229-238, 1995.

"PatchMatch: A Randomized Correspondence Algorithm for Structural Image Editing," ACM Transactions on Graphics, Barnes, C., Shechtman, E., Finkelstein, A. and Goldman, Dan B., Proc. SIGGRAPH 28(3), Aug. 2009, 10 pages.

"ArtRage 3", Ambient Design, http://www.ambientdesign.com/, from web.archive.org on Aug. 23, 2011, (May 25, 2010), 1 page.

(56) References Cited

OTHER PUBLICATIONS

"Auryn Inc. Auryn Ink", *iTunes Preview*, retrieved from <http://itunes.apple.com/us/app/auryn-Auryn1%_201nklid407668628>, (Jul. 20, 2011), 2 pages.

"Auryn Ink Review", www.giggleapps.com, (Feb. 10, 2011), 4 pages.

"Auryn Releases "Auryn Ink" Watercolor App; Named One of the Seven Most Innovative iPad Apps of 2010 by fast Company", www.marketwire.com, (Jan. 4, 2011), 2 pages.

"Corel Painter 11 Features", retrieved from <http://web.archive.org/web/20100526115240/http://www.corel.com/servlet/Satellite/us/en/Product/1166553885783#tabview=tab1> on Mar. 23, 2011, 3 pages.

"Corel Painter 11 Overview", retrieved from <http://web.archive.org/web/20100526115240/http://www.corel.com/servlet/Satellite/us/en/Product/1166553885783#tabview=tab0> on Aug. 23, 2011, 3 pages.

"Final Office Action", U.S. Appl. No. 12/858,558, (Feb. 15, 2013), 14 pages.

"Non-Final Office Action", U.S. Appl. No. 12/858,546, (Jan. 30, 2013), 19 pages.

"Non-Final Office Action", U.S. Appl. No. 12/858,558, (Aug. 30, 2012), 10 pages.

"Non-Final Office Action", U.S. Appl. No. 12/868,540, (Feb. 22, 2013), 12 pages.

"Notice of Allowance", U.S. Appl. No. 12/858,552, (Apr. 20, 2012), 8 pages.

"U.S. Application as Filed", U.S. Appl. No. 12/039,164, filed Feb. 28, 2008, 60 pages.

Ando, Ryoichi et al., "Vector Fluid: A Vector Graphics Depiction of Surface Flow", *NPAR '10: Proceedings of the 8th International Symposium on Non-photorealistic Animation and Rendering* (pp. 129-135). New York, NY, USA: ACM, (2010), 7 pages.

Ando, Ryoichi et al., "Vector Graphics Depicting Marbling Flow", *Computers & Graphics*, vol. 35 Issue 1, (Nov. 29, 2010), 14 pages.

Ashikhmin, Michael "Synthesizing Natural Textures", *Proceedings of the Symposium on Interactive 3D Graphics 2001*, (2001), 10 pages.

Barla, et al., "Stroke Pattern Analysis and Synthesis", *EUROGRAPHICS 2006*, vol. 25 (2006), No. 3, (2006), 9 pages.

Barnes, Connelly et al., "The Generalized Patch Match Correspondence Algorithm", retrieved from <http://www.cs.princeton.edu/gfx/pubs/Barnes_2010_TGP/index.php> on Sep. 9, 2010, 14 pages.

Bhat, Pravin et al., "GradientShop: A Gradient-Domain Optimization Framework for Image and Video Filtering", *ACM Transactions on Graphics* 29(2), (2010), 15 pages.

Bugeau, Aurelie et al., "A Comprehensive Framework for Image Inpainting", *IEEE Transactions on Image Processing*, vol. 19 No. 10, (Oct. 2010), pp. 2634-2645.

Chen, Xuejin et al., "Sketch-Based Tree Modeling Using Markov Random Field", *ACM Trans. on Graphics* 27, 5, (2008), 9 pages.

Deussen, Oliver et al., "Floating Points: A Method for Computing Stipple Drawings", *EUROGRAPHICS 2000*, vol. 19 (2000), No. 3, (2000), 10 pages.

Deussen, Oliver et al., "The Elements of Nature: Interactive and Realistic Techniques", *SIGGRAPH 2004 Course 31*, (2004), 64 pages.

Diverdi, et al., "U.S. Application as Filed", U.S. Appl. No. 13/219,457, filed Aug. 26, 2011, 104 pages.

Diverdi, Stephen J., et al., "U.S. Application as Filed", U.S. Appl. No. 13/219,453, filed Aug. 26, 2011, 102 pages.

Duran, Jonathan "Deco Tool and Spray Brush for retrieved from Creating Complex, Geometric Patterns in Flash", retrieved from <http://www.adobe.com/devnet/flash/articles/deco_intro.html> on Aug. 31, 2010, (Feb. 2, 2009), 19 pages.

Esch, Greg et al., "Interactive Procedural Street Modeling", *SIGGRAPH 2007 Sketches*, (2007), 1 page.

Hacohen, Yoav et al., "Non-Rigid Dense Correspondence with Applications for Image Enhancement", *SIGGRAPH*, (2011), 9 pages.

Hang, Chu S., "Making Digital Painting Organic", *PhD Thesis, Hong Kong University of Science and Technology*, (Aug. 2007), 126 pages.

Hertzmann, Aaron et al., "Curve Analogies", *13th Eurographics Workshop on Rendering (2002)*, 13 pages.

Hertzmann, Aaron et al., "Image Analogies", *Proceedings of SIGGRAPH 2001*, (2001), 14 pages.

Igarashi, Takeo et al., "A Suggestive Interface for 3D Drawing", *Proceedings of the ACM Symposium on User Interface Software and Technology, UIST 01. 2001, ACM*: Orlando, Florida, (2001), 9 pages.

Ijiri, Takashi et al., "The Sketch L-System: Global Control of Tree Modeling Using Free-Form Strokes", *Proceedings of 6th International Symposium SmartGraphics 2006*, (2006), 9 pages.

Jodoin, Pierre-Marc et al., "Hatching by Example: A Statistical Approach", *Proceedings of NPAR 2002*, (2002), 8 pages.

Kaneva, Biliana et al., "Infinite Images: Creating and Exploring a Large Photorealistic Virtual Space", *Proceeding of the IEEE*, vol. 98, No. 8, (Aug. 2010), 17 pages.

Lin, Wen-Yan et al., "Smoothly Varying Affine Stitching", *Proceedings of Computer Vision and Pattern Recognition (CVPR)*, (Jun. 2011), 13 pages.

Lintermann, Bernd et al., "Interactive Modeling of Plants", *IEEE Computer Graphics and Applications*, 19 (1999), 1, (1999), pp. 2-11.

Lloyd, Stuart P., "Least Squares Quantization in PCM", *IEEE Transactions on Information Theory*, vol. 28, No. 2, (Mar. 1982), pp. 129-137.

Mansfield, Alex et al., "Transforming Image Completion", *Proceedings of British Machine Vision Conference (BMVC)*, (Aug. 29, 2011), 11 pages.

Marks, et al., "Design Galleries: A General Approach to Setting Parameters for Computer Graphics and Animation", *ACM Computer Graphics (SIGGRAPH '97 Proceedings)*, (Aug. 1997), 26 pages.

Matsuda, Okiharu "U.S. Application as Filed", U.S. Appl. No. 13/219,848, filed Aug. 29, 2011, 27 pages.

McVeigh, Chris "ArtRage Studio Pro 3", *PCWorld*, retrieved from <http://www.pcworld.com/businesscenter/article/189221/artrage_studio_pro_3.html> on Aug. 23, 2011, 4 pages.

Mech, Radomir et al., "U.S. Application as Filed", U.S. Appl. No. 12/857,382, filed Aug. 16, 2010, 57 pages.

Mech, Radomir et al., "U.S. Application as Filed", U.S. Appl. No. 13/029,036, filed Feb. 16, 2011, 69 pages.

Mech, Radomir et al., "Visual Models of Plants Interacting with Thier Environment", Proceedings of SIGGRAPH 96 (New Orleans, LA, Aug. 4-9, 1996), Computer Graphics, (1996), 15 pages.

Muller, Matthias et al., "Meshless Deformations Based on Shape Matching", *ACM Transactions on Computer Graphics*, 24, 3 (2005), (2005), 8 pages.

Muller, Pascal et al., "Procedural Modeling of Buildings", *ACM Trans. Graph.*, 25 (2006), 3, (2006), 10 pages.

Parish, Yoav I., et al., "Procedural Modeling of Cities", *Proceedings of ACM SIGGRAPH 2001*, (2001), 8 pages.

Pritch, Yael et al., "Shift-Map Image Editing", *ICCV '09*, Kyoto, Japan, (Sep. 2009), 8 pages.

Prusinkiewicz, et al., "Phyllotaxis", *The Algorithmic Beauty of Plants, Springer-Verlag, Chapter 4*, ISBN 978-0387972978, (1990), pp. 99-118.

Prusinkiewicz, et al., "Synthetic Topiary", *Proceedings of ACM SIGGRAPH*, (1994), 8 pages.

Ruiters, Roland et al., "Patch-Based Texture Interpolation", *Eurographics Symposium on Rendering*, vol. 29, No. 4, (2010), 9 pages.

Salisbury, Michael P., et al., "Interactive Pen-and-Ink Illustration", *Proceedings of SIGGRAPH 1994*, (1994), 8 pages.

Shapira, et al., "Image Appearance Exploration by Model-Based Navigation", *Computer Graphics Forum, Eurographics*, vol. 28 (2009), No. 2, (Mar. 30-Apr. 3, 2009), (Mar. 30, 2009), 10 pages.

Shechtman, Eli et al., "Regenerative Morphing", *CVPR*, (2010), 8 pages.

Shechtman, Elya et al., "U.S. Application as Filed", U.S. Appl. No. 12/868,519, filed Aug. 25, 2010, 45 pages.

Sims, Karl "Artificial Evolution for Computer Graphics", *Computer Graphics* 25,4, (Aug. 1991), 9 pages.

Suh, et al., "Automatic Thumbnail Cropping and its Effectivenenss", *UIST '03: Proceedings of the 16th annual ACM symposium on User interface software and technology*, ACM Press, New York, NY, USA, (Nov. 2003), pp. 95-104.

(56) References Cited

OTHER PUBLICATIONS

Sunkavalli, Kalyan et al., "Multi-Scale Image Harmonization", *ACM SIGGRAPH*, vol. 29 (2010), 10 pages.
Turk, Greg "Texture Synthesis on Surfaces", *Proccedings of SIGGRAPH 2001*, (2001), 8 pages.
Van Laerhoven, Tom "An Extensible Simulation Framework Supporting Physically-based Interactive Painting", *PhD thesis, University of Limburg*, (Jun. 21, 2006), 171 pages.
Winkenbach, Georges et al., "Computer-Generated Pen-and-Ink Illustration", *Proceedings of SIGGRAPH 1994*, (1994), 11 pages.
Winnemoeller, et al., "U.S. Application as Filed", U.S. Appl. No. 12/858,552, filed Aug. 18, 2010, 70 pages.
Wong, Michael T., et al., "Computer-Generated Floral Ornament", *Proceedings of SIGGRAPH 1998*, (1998), 12 pages.
Wonka, Peter et al., "Instant Architecture", *ACM Trans. Graph.*, 22 (2003), 3, (2003), 9 pages.
"Corrected Notice of Allowance", U.S. Appl. No. 12/858,546, (Jun. 6, 2013), 8 pages.
"Notice of Allowance", U.S. Appl. No. 12/858,546, (May 6, 2013), 12 pages.
Lee, Hyunjoon et al., "Automatic Upright Adjustment of Photographs", *CVPR* (2012), 11 pages.
"Notice of Allowance", U.S. Appl. No. 12/868,540, (Jul. 22, 2013), 10 pages.

\* cited by examiner

Image A          Image B
 
FIG. 4A          FIG. 4B
Offset field
$A \rightarrow B$
FIG. 4C
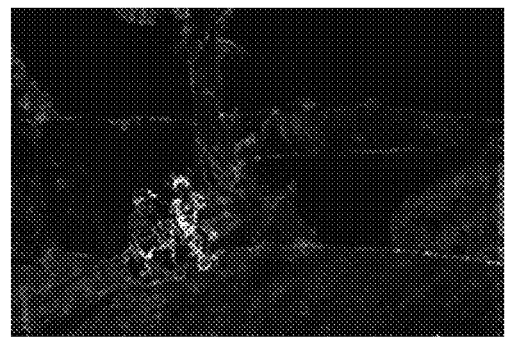
Distance map
$A \rightarrow B$
FIG. 4D

METHODS AND APPARATUSES FOR GENERATING CO-SALIENT THUMBNAILS FOR DIGITAL IMAGES

PRIORITY CLAIM

This application claims benefit of priority of U.S. Provisional Appl. No. 61/243,932, filed Sep. 18, 2009, which is hereby incorporated by reference in its entirety.

BACKGROUND

Description of the Related Art

Digital photography first began to appear in the United States in the 1990s. Nowadays digital cameras are commonplace, ranging from higher-end professional devices to lower-end mobile phones. With few exceptions, digital cameras have essentially replaced their film counterparts.

A typical digital photography workflow begins with the user taking several shots of a subject. An advantage of digital photography over film is its freedom to capture a multitude of images with virtually no added expense. In fact, there are situations where a user may take dozens, or even hundreds of pictures of the same subject. The differences between the various shots may include, for example, variations in the scenery or background, in the subject's position, or perhaps in the camera's settings (e.g., focus, exposure, ISO, white balance, etc.). By taking multiple shots, the user increases the odds of capturing at least a few good pictures.

Sometimes during a photo session, a user may switch the camera from "picture mode" to "view mode" (or something to that effect) in order to get a feel for what the pictures being taken look like. Most modern digital cameras have a relatively small display that allows the user to view the pictures stored in the camera's memory. To help the user navigate the images stored in the camera, the camera may display "thumbnails" of each image, as shown in FIG. 1.

At the end of the session, the user may then transfer the pictures from the camera's memory to a computer for cataloguing and further processing. For example, the newly taken pictures may be added to an image collection. An image collection software may create "thumbnails" for each of the transferred images, and several thumbnails may be viewed simultaneously on a larger computer screen at a later time.

The use of thumbnails may enable concurrent presentation of multiple images, which may simplify navigation and use of the images relative to viewing individual images serially. However, even on a large display such as a desktop or laptop computer, it may be difficult to locate a particular image within a set of very similar images (e.g., multiple images of the same scene). This difficulty may be further compounded on small display devices such as those found on digital cameras.

SUMMARY

Various embodiments of methods and apparatuses for generating and/or selecting context-sensitive, co-salient thumbnails are described. Generally speaking, "co-salient" thumbnails may refer to thumbnails that are salient when considered with reference to some context. For example, co-salient thumbnails may be salient with respect to a particular setting or reference (such as a scene), or they may be salient with respect to each other. Some embodiments may generate and/or select context-sensitive, co-salient thumbnails for similar images that may highlight salient visual differences between the images. Co-salient thumbnails created using the methods described herein may effectively convey more useful information to a user than conventional thumbnails. Further, co-salient thumbnails as described herein may use the same or similar display space as conventional thumbnails. As such, these co-salient thumbnails may make it easier for the user to locate a particular image in a large collection of similar images.

In some embodiments, a method for selecting context-sensitive, co-salient thumbnails may process a pair of digital input images to produce as output two thumbnail crops that may show salient visual differences between the images. In other embodiments, a method may select two or more co-salient thumbnails for a single pair of images. One illustrative method for selecting context-sensitive, co-salient thumbnails for images may be based in part on finding nearest neighbor patches from one image to another. Various embodiments may use one similarity measure, for example an offset similarity measure, or two or more different similarity measures, for example a color similarity measure and an offset similarity measure, to compare patches in images. These similarity measures may indicate a correspondence between patches in a first image and a second image.

Some embodiments may find multiple patches within a region (e.g., a candidate crop) of a first image, and then find the most similar patches in a second image. A distance may be computed between each patch in the first image and each corresponding patch in the second image. For example, a color similarity measure and an offset similarity measure may be determined for each patch, and then combined to determine the distance between patches in two images. The distances may be accumulated for an entire candidate crop at each crop location in the first image, and a score may be determined at each crop location in the first image. From the scores, a least representative (most saliently different) crop in the first image relative to the second image may be determined.

In some embodiments, the distances between corresponding patches in two images are processed in the form of a patch distance map ("distance map"). For example, in a patch distance map, the intensity of each portion of the map may indicate a distance between a portion of a first image and a corresponding portion of a second image. The patch distance map may then be further processed or filtered to account for panning artifacts, rotation artifacts, planar motion, local contrast, incoherency, etc. The filtered distance map may then be used to find an optimally co-salient crop, and a co-salient thumbnail may be generated based at least in part on the optimally co-salient crop. The process may be repeated from the second image to the first image to find a least representative crop in the second image relative to the first image and to generate a co-salient thumbnail for the second image.

In some embodiments, finding an optimal pair of thumbnails may involve solving for both the position (location) and the scale at which the crops should be taken. To solve for scale, some embodiments may iteratively solve for position at multiple different scales. Results at all scales may be compared to determine an overall best pair of crops.

BRIEF DESCRIPTION OF THE DRAWINGS

FIGS. 4A and 4B show input image A and image B, respectively, according to some embodiments.

FIG. 4C shows offset field A→B according to some embodiments.

FIG. 4D shows distance map A→B according to some embodiments.

Figure 1:
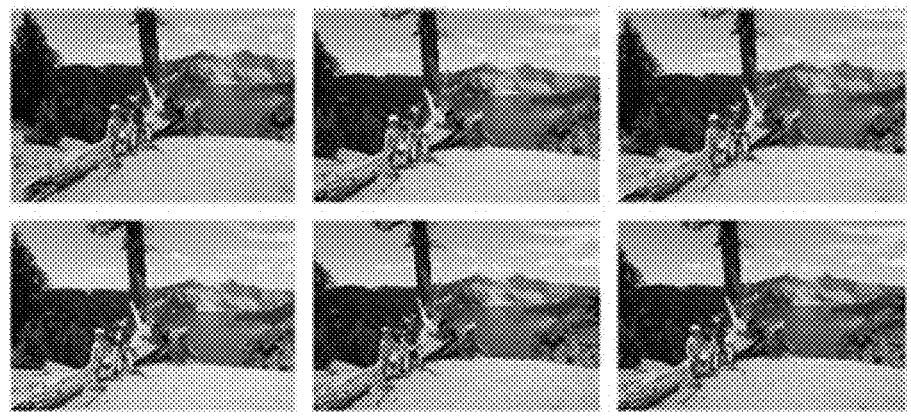
FIG. 1 illustrates a collection of nearly identical images displayed as standard thumbnails.

It should be noted that some of the images reproduced in the figures described above have been converted from color images to grayscale images. Also, brightness and contrast may have been adjusted to more clearly show content of the images.

While this specification provides several embodiments and illustrative drawings, a person of ordinary skill in the art will recognize that the present disclosure is not limited only to the embodiments or drawings described. It should be understood that the drawings and detailed description are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 2:
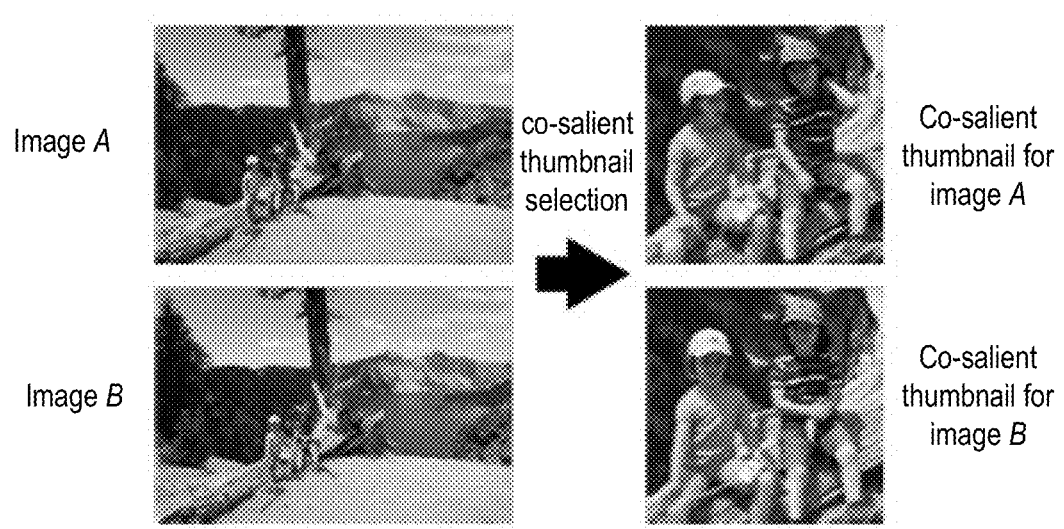
FIG. 2 illustrates selecting context-sensitive, co-salient thumbnails for a pair of similar images A and B according to some embodiments.

Various embodiments of methods and apparatuses for generating and selecting context-sensitive, co-salient thumbnails are described. In various embodiments, a method may generate and/or select context-sensitive, co-salient thumbnails for pairs of similar images that may highlight the salient visual differences between the images. FIG. 2 illustrates results obtained with a method for generating or selecting context-sensitive, co-salient thumbnails for a pair of similar images A and B according to some embodiments. Co-salient thumbnails created using the methods described herein may effectively convey more useful information to the user than conventional thumbnails using the same or similar display space. In this particular instance, the co-salient thumbnails for images A and B of FIG. 2 show detailed differences in the subjects' pose that may not be immediately apparent from full images A and B, nor from conventional thumbnails such as those depicted in FIG. 1.

An example of an environment in which the methods for selecting co-salient thumbnails as described herein may be applied is an environment where there is a limited pixel budget, such as the display screens of digital cameras, cell phones, or other small electronic consumer devices. Another example of an environment in which the methods may be applied is digital photograph viewing and/or processing software on desktop or laptop computers where the user may view a relatively large number of thumbnails for one or more collections of images. In general, embodiments may be applicable on any device and in any environment in which a user may want to view thumbnails for collections of images, and particularly where an image collection may include multiple similar images.

As an example, a photographer may capture essentially the same scene multiple times with a digital camera with the hope that one of the images will have a good combination of exposure, subject pose, focus, etc. This may result in a collection of images that, despite subtle differences, are otherwise very similar to each other. Locating a preferred image in a collection of similar images may be difficult using conventional, uniformly scaled thumbnails, especially on small display devices such as those found on digital cameras, but also on other devices with larger displays. At the scale used in conventional thumbnails, it is difficult for the viewer to distinguish differences between the images. Co-salient thumbnails selected by the methods described herein highlight salient differences between images and convey more useful information to the user than conventional thumbnails using the same or similar display space, thus making it easier for the photographer to locate a preferred image in a collection of similar images.

In some embodiments, the space that the co-salient thumbnails are selected from is a set of possible crops of a given size from the images at varying scales. The full space of crops may be too large to examine fully; therefore, some embodiments may subsample the space, for example by examining crops arranged in a grid on each image, by randomly selecting representative crops, by filtering crops according to some measurable characteristic, or according to any other suitable subsampling technique. Filtering may be performed, for example, with any filter (such as a box filter, or the like) having support similar to the area of the crop.

One illustrative method for selecting context-sensitive, co-salient thumbnails for images may be based in part on finding nearest neighbor patches from one image to another. Embodiments may use one or more different similarity measures, for example a color difference and offset gradients, to compare patches in images. These similarity measures may indicate a correspondence between patches in a first and second images.

Generally speaking, a "patch" may refer to a region of an image, which may be identified in terms of a number of vertices of a polygon, in terms of one or more functions that identify the boundaries of the patch, in terms of surfaces in a multidimensional space, or in any other suitable type of representation. "Patch distance" may refer to a metric, such as a scalar or vector, that expresses the distance or divergence between patches within some representational space. For example, one measure of patch distance might reflect the geometric distance between patches in a two- or three-dimensional visual space. However, patch distance may also be determined within spaces having any suitable number of dimensions.

It is noted that the distance between patches need not be determined in the same space in which the patches are defined with respect to an image. For example, a patch may be defined as a region of an image having specific dimensions or extents within the image, such as a surface. This space in which a patch is defined may be referred to as "image space." However, patches may be compared with a "patch space" that differs from the image space. For example, whereas a given patch may correspond to a surface within an image space, the given patch may correspond to a point within a multidimensional patch space, where the point represents some transformation of the patch information in the image space (such as a concatenation or other transformation of the pixel values that lie within the boundaries of the patch in the image space). Thus, one measure of patch distance between two patches is the distance between the points representing those patches in the patch space. A scalar distance between patches may be determined within the patch space using any of a variety of suitable norms, such as the L2 norm, the L1 norm, the truncated L2 norm, or the L-infinity norm. As an example implementation, an embodiment may employ square patches having pixel extents of 7×7 in the image space. To determine patch distances, this embodiment may map these patches onto points in a 7×7×3 multidimensional color space that corresponds to the patch space and may determine patch distances within this space according to, e.g., the L2 norm.

For example, some embodiments may find multiple patches within a region (e.g., a candidate crop) of a first image, and then find similar patches (e.g., those patches that maximize a similarity measure or otherwise satisfy a similarity criterion) in a second image. A distance or divergence may be computed between each patch in the first image and each corresponding patch in the second image. For example, a color similarity measure and an offset similarity measure may be determined for each patch, and then combined. In some embodiments, the offset similarity measure and the color similarity measure may each be assigned respective weights, and the weight of the offset similarity measure may be smaller (or weaker) than the weight of the color similarity measure. In other embodiments, a "local similarity of offsets" may be used to capture the divergence of neighboring correspondence vectors or offsets, or more generally some function of the mapping divergence or coherence. These distances may be accumulated for an entire candidate crop at each crop location in the first image, and a score may be determined at each crop location in the first image. A saliently different crop may then be determined dependent upon the scores. For example, a least representative (most saliently different) crop in the first image relative to the second image may be determined from the scores.

It is noted that in at least some instances, a scalar distance metric between corresponding patches in different images may be understood to be a special case of a more general property of divergence (or inversely, coherence) of the mapping between these patches. Such divergence/coherence may be a more complex (e.g., multidimensional) measure of the mapping between the patches than a scalar distance metric. For simplicity, this discussion makes frequent reference to use of a distance metric. However, it is contemplated that in various embodiments, any suitable measure of the divergence/coherence of the mapping may be employed instead of or in addition to a scalar distance metric.

In some embodiments, distances between corresponding patches in two images are processed in the form of a patch distance map. For example, in a patch distance map, the intensity of each portion of the map may indicate a distance between a portion of a first image and corresponding portion of a second image. The distance map may then be processed or filtered to account for panning artifacts, rotation artifacts, planar motion, local contrast, incoherency, etc. The filtered distance map may then be used to find one or more optimal crops, and at least one co-salient thumbnail may be generated based at least in part on the one or more optimal crops. The process may be repeated from the second image to the first image to find one or more least representative crop in the second image relative to the first image. For example, the corresponding crop in the second image may be selected either using the patch offsets within a crop, or using a "dominant offset" computed as the mode of the patch offsets. The process may then generate at least one co-salient thumbnail for the second image.

Figure 12:
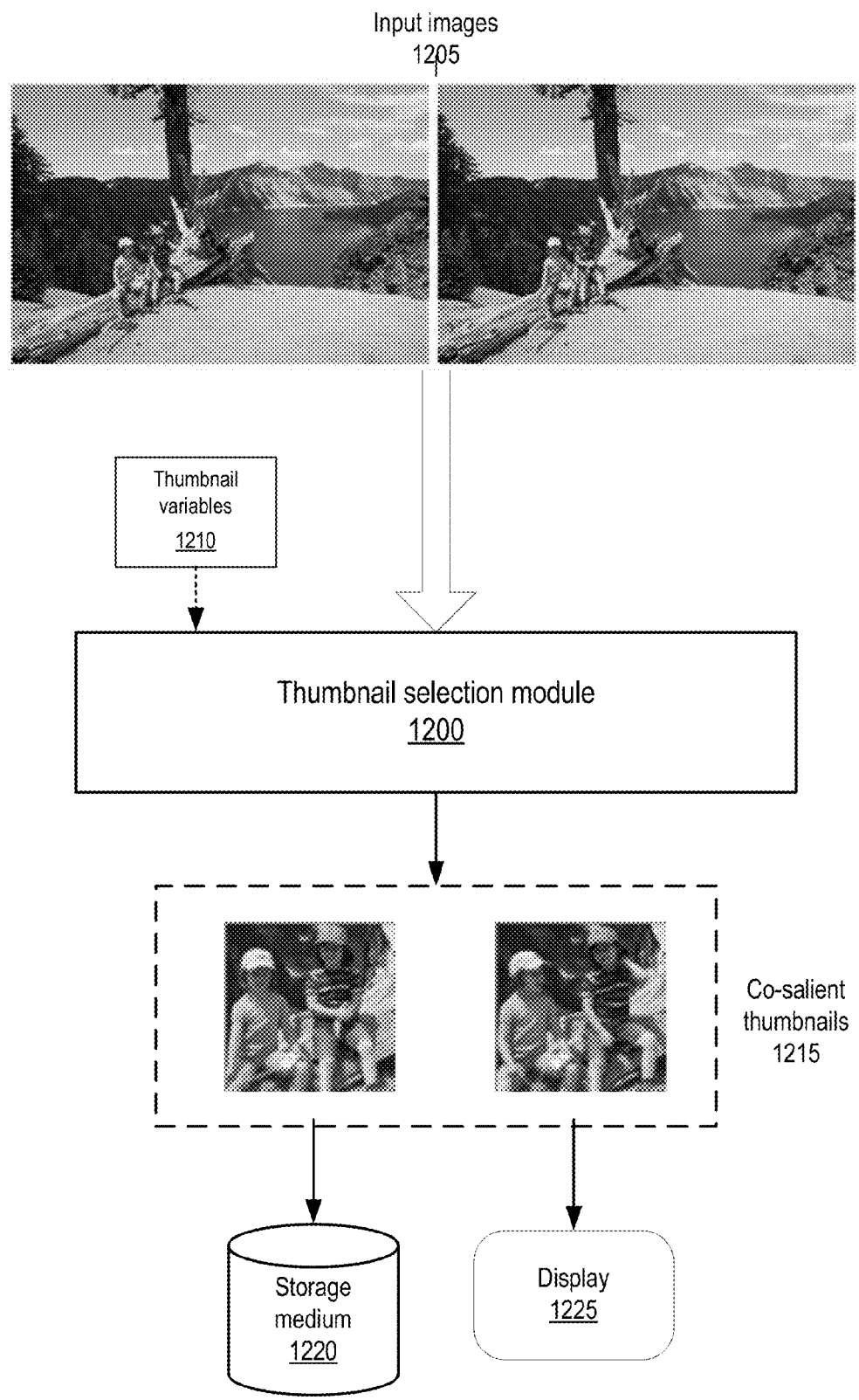
FIG. 12 illustrates a thumbnail generation module that may implement one or more methods for selecting co-salient thumbnails according to some embodiments.
Figure 13:
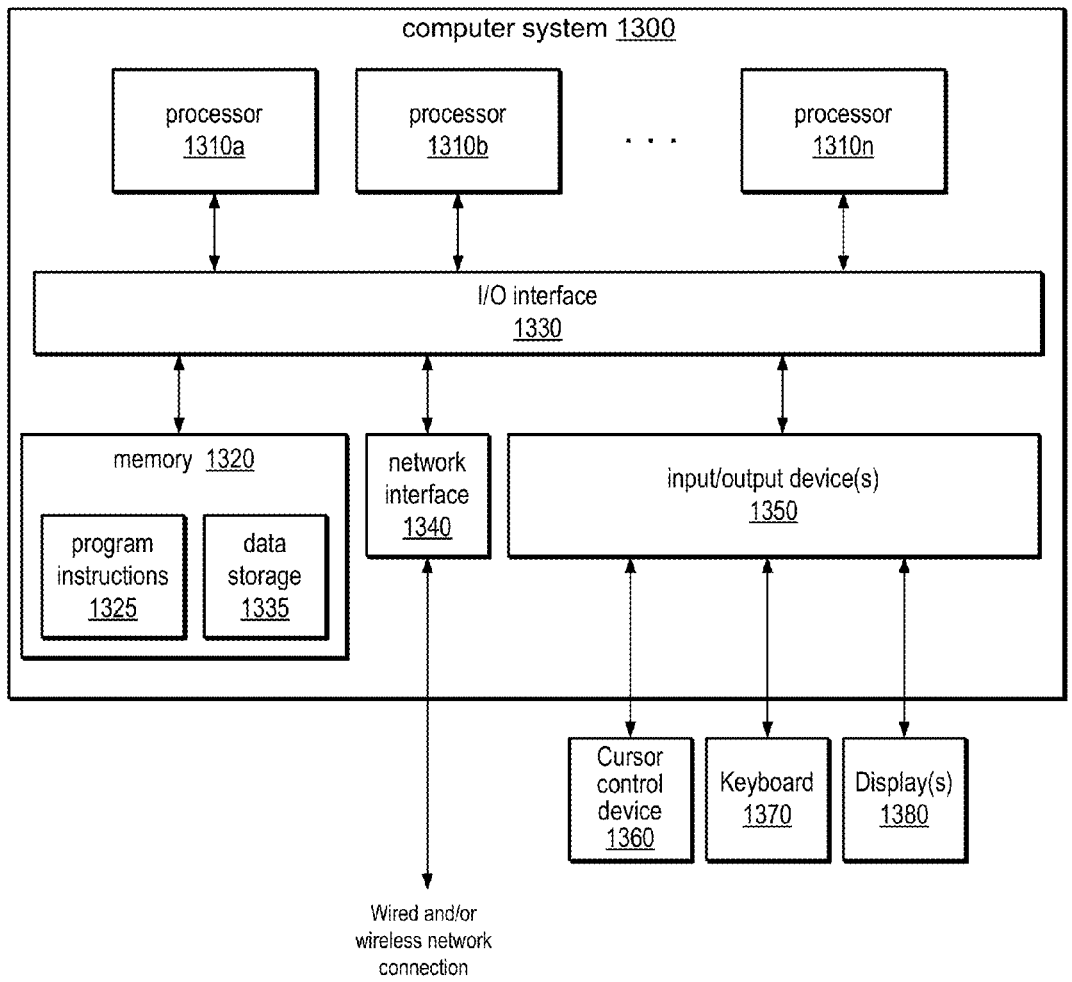
FIG. 13 illustrates an illustrative computer system that may be used in embodiments.

Embodiments of methods for selecting context-sensitive, co-salient thumbnails for images may be implemented, for example, in a thumbnail selection module. An example thumbnail selection module is illustrated in FIG. 12. An example system on which embodiments of a thumbnail selection module may be implemented and executed is illustrated in FIG. 13. FIGS. 12 and 13 are discussed in greater detail below.

Thumbnail Generation

Figure 3:
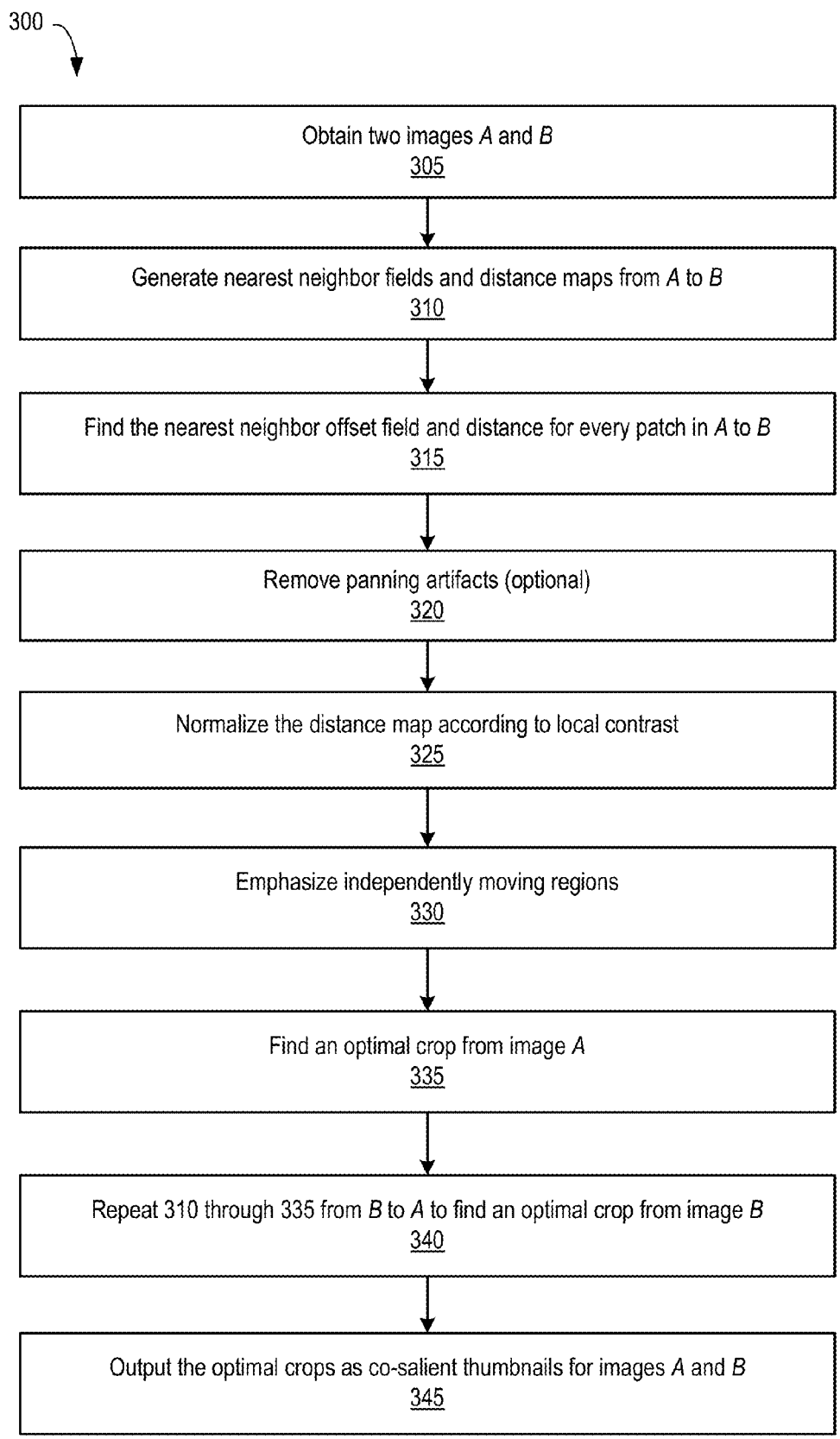
FIG. 3 is a flowchart of a method for generating co-salient thumbnails according to some embodiments.

FIG. 3 is a flowchart of a method for generating co-salient thumbnails according to some embodiments. In some embodiments, co-salient thumbnail generation method 300 obtains as input two similar images (referred to herein as image A and image B), as illustrated at operation 305. For example, the images may be digital photographs captured via a digital camera, or digital images that were digitized from conventional photographs or film negatives. As another example, the images may be digital or digitized frames from captured video. As yet another example, the images may be synthesized images, such as, for example, drawings, renderings, 3-D pictures, or the like. In general, the images may be any type of digital image or combinations thereof. Each image or thumbnail may be in or more formats such as, for example, JPEG, JFIF, Exif, TIFF, RAW, PNG, GIF, BMP, CGM, SVG, PNS, JPS, etc. A person of ordinary skill in the art will recognize in light of this specification that any format may be used.

Figure 9:
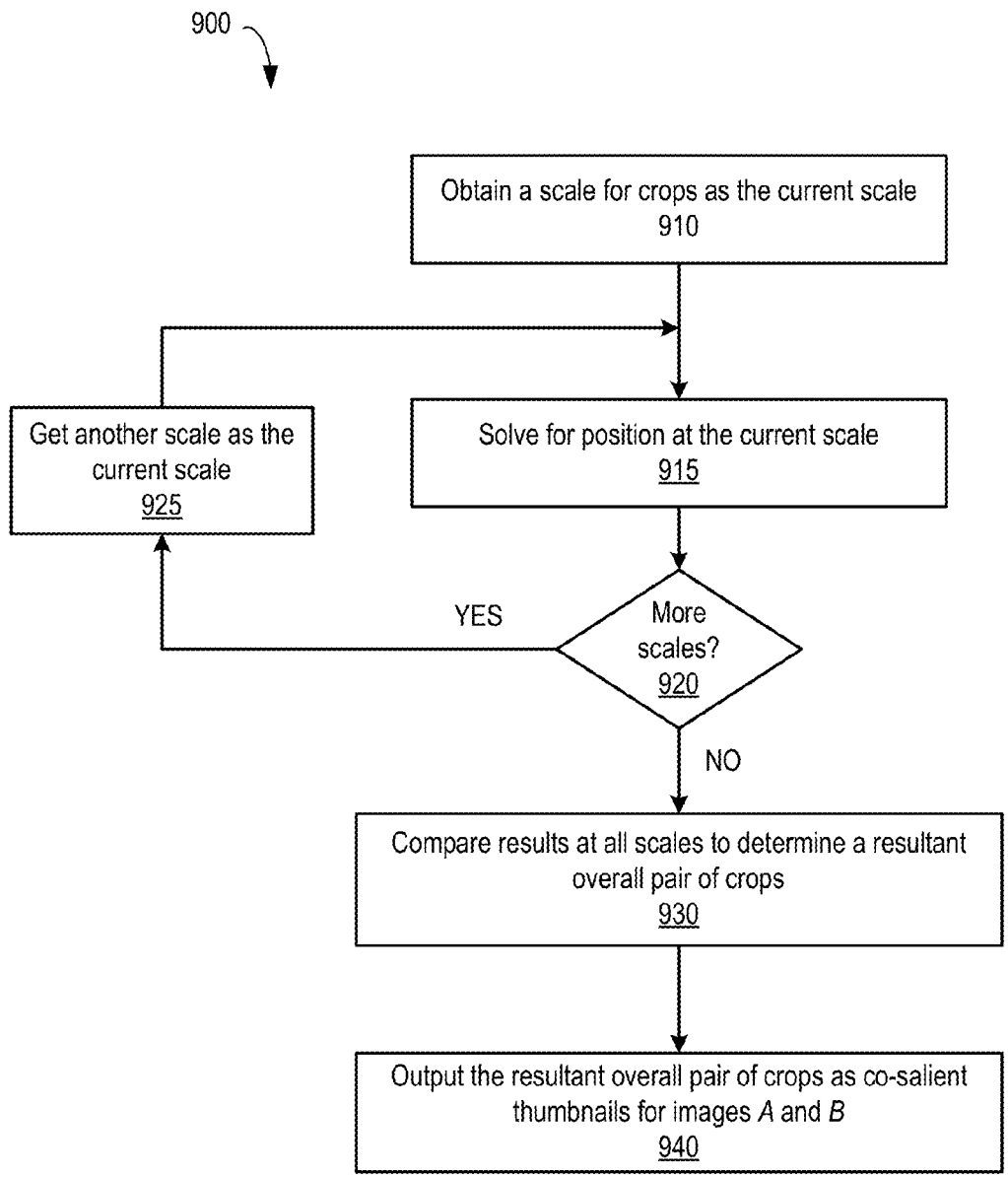
FIG. 9 is a flowchart of a method for determining a scale of a co-salient thumbnail according to some embodiments.

In some embodiments, values for one or more other thumbnail selection parameters, such as a desired thumbnail size, may also be obtained. Method 300 may process input images A and B to produce as output two (or more) thumbnails that may best show salient visual differences between the input images. In some embodiments, finding an optimal pair of thumbnails may involve solving for both the position and the scale at which the crops should be taken. Operations 310 through 340 of FIG. 3 illustrate processing that may be performed in some embodiments to solve for position. FIG. 9 illustrates processing that may be performed in some embodiments to solve for scale. These processes are described in turn below.

Solving for Position

As indicated at operation 310 of method 300, nearest neighbor fields and distance maps may be generated from image A to image B (A→B). In embodiments, a quantitative measure of uniqueness may be based on nearest neighbor fields and distance maps. For example, the nearest neighbor fields and distance maps may be generated according to a randomized correspondence algorithm for structural image editing, for example the Patch-Match algorithm as described in *Patch-Match: A Randomized Correspondence Algorithm for Structural Image Editing. ACM Transactions on Graphics*, Barnes, C., Shechtman, E., Finkelstein, A. and Goldman, Dan B., *Proc. SIGGRAPH* 28(3), August 2009. However, other nearest neighbor search algorithms or techniques may be used in other embodiments. For example, an algorithm based on kd-trees (k-distance trees), a brute force search technique, or other suitable technique may be used.

Unique visual content in one image may not have a good match in the other image, and thus may have a high distance from its nearest neighbor patch. Because offset fields and distance maps produced by a technique such as Patch-Match are asymmetric, to select co-salient thumbnails for both images, operations 310 through 335 may be performed twice—i.e., once from A→B and again from B→A, as represented by operation 340. For brevity, the discussion that follows addresses only the processing for A→B. The processing for B→A may be similar to the processing for A→B. Moreover, it is noted that if symmetric similarity measures are employed, separate processing for B→A may be unnecessary and omitted.

Still referring to operation 310 of method 300, FIGS. 4A through 4D illustrate example results of the application of a technique such as the Patch-Match algorithm to input images A and B. Results are shown from image A to B (A→B), according to some embodiments. Particularly, FIGS. 4A and 4B show image A and image B, respectively. FIG. 4C shows an offset field A→B calculated using a Patch-Match algorithm. And FIG. 4D shows a distance map A→B, also calculated using the Patch-Match algorithm. As noted above, results for the inverse query B→A are not shown, but may be used essentially identically in the following operations.

As indicated at operation 315 of method 300, the nearest neighbor offset field and distance for patches in image A to image B may be found. The patch distance map of FIG. 4D may show high error in regions of the image that change substantially between the images, such as the two children sitting on the log in FIGS. 4A and 4B.

In some embodiments, a raw distance map such as the one of FIG. 4D may not be immediately suitable to find salient regions of an image. For example, the information contained in the distance map of FIG. 4D may be masked by the distance map's tendency to show more error in high contrast regions as well as along the edges where the image has been panned. Therefore, the distance map may be filtered, for instance, to remove panning artifacts, rotation artifacts, and/or planar motion; to incorporate a contrast map; and/or to emphasize independently moving image regions, as described in turn below.

As indicated at operation 320 of method 300, in some embodiments, regions that appear at the edge of only one image due to camera panning may be eliminated from consideration. Because it is difficult to hold a camera perfectly still across a series of shots, it is common to see slight changes in the field of view between the input images. This is often seen as a minor pan that behaves as a translation in image space. The disjoint regions not shared by the two images tend to have very high error, because each is only present in a single image. However, such slight pans may rarely yield salient differences, and thus may be factored out of the distance map to improve results. Some embodiments may thus eliminate these panning artifacts by finding a dominant offset between the two images. This may be implemented, for example, as the mode of the offset field in x and y. With the dominant offset identified, a method may mask out regions not in the intersection of the two images from the distance map of FIG. 4D.

Figure 5A:
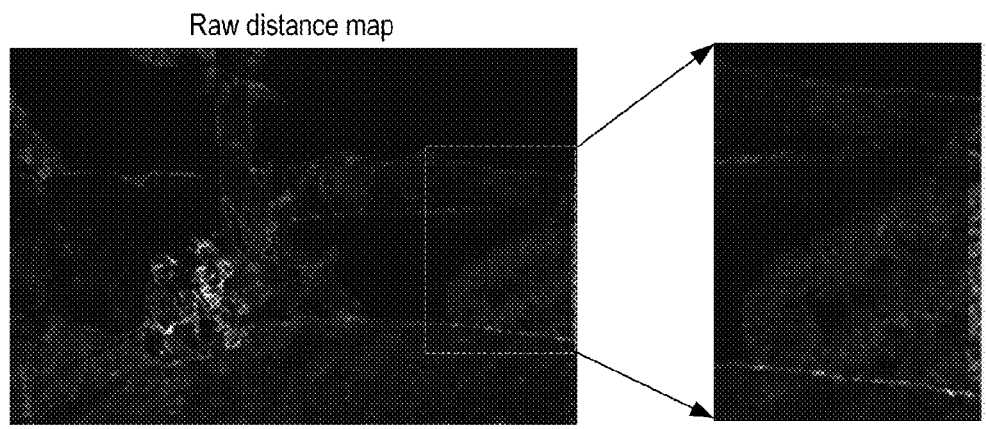
FIGS. 5A and 5B illustrate an example of panning artifact removal according to some embodiments.
Figure 5B:
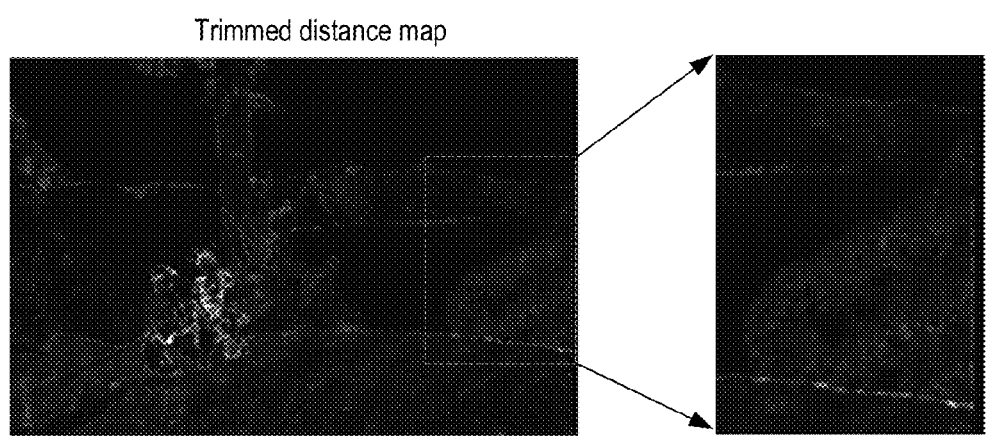

FIGS. 5A and 5B illustrate an example of panning artifact removal according to some embodiments. Particularly, FIG. 5A shows a raw distance map, and FIG. 5B shows a trimmed distance map using this technique. Zoom-ins to a region on the right of both images (highlighted by the white dashed rectangle in both images) are also shown. It should be noted that the panning error that has been removed midway along the right edge of the trimmed distance map. As a person of ordinary skill in the art will recognize in light of this specification, other types of artifacts such as, for example, rotation artifacts and planar motion (e.g., scale or perspective transforms), may also be corrected in a similar fashion.

As indicated at operation 325 of method 300, the distance map of FIG. 4D may be normalized according to local contrast. Because raw distance maps may be biased towards showing more error in high contrast regions, in some embodiments a method may normalize a distance map by multiplying it with a measure inversely proportional to the local contrast of the input image. For example, the measure multiplied with the distance map may be a blurred gradient magnitude of the luminance channel of the input image as follows:

$$\text{contrast}(x, y) = G * \sqrt{\left(\frac{dI}{dx}\right)^2 + \left(\frac{dI}{dy}\right)^2}$$

where I is the luma channel of the input image represented in the LAB color space and G is a Gaussian kernel. A LAB color space is a color-opponent space with dimension L for lightness and a and b for the color-opponent dimensions. However, this describes only one possible measure for local contrast. Other measures for local contrast may be used in other embodiments.

In some embodiments, the contrast map may be incorporated into the distance measure according to the following:

distance(x,y)=patch match distance(x,y)/(1+contrast(x, y))

Figure 6A:
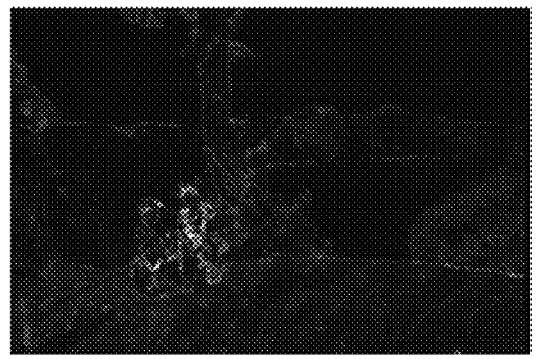
FIGS. 6A through 6C illustrate an example of distance map contrast normalization according to some embodiments.
Figure 6B:
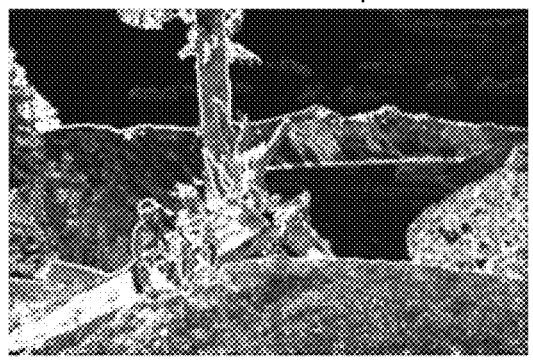
Figure 6C:

FIGS. 6A through 6C illustrate an example of distance map contrast normalization according to some embodiments. In particular, FIG. 6A shows a trimmed (but otherwise raw) version of the distance map of FIG. 4D. FIG. 6B shows a local contrast map corresponding to images A and/or B. And FIG. 6C shows a resultant normalized distance map using this technique.

As indicated at operation 330 of method 300, independently moving regions may be emphasized in the distance map. Although normalizing by contrast helps to reduce the amount of false error detected in the distance map, in some situations it may also be desired to isolate changing scene content. For example, if the input images are very similar, the offset fields between them tend to have large coherent regions that cover the majority of the image. The portions of the image that change, however, may rarely have nearest neighbor patches that agree with the dominant offset. Instead, these parts tend to have many small patches mapping all over the second image. Leveraging this observation, some embodiments may improve the quality of the distance map by modulating or multiplying the distance map by a measure of the local incoherency of the offset field. For example, a measure of local incoherency of the offset field that may be used is a blurred gradient magnitude (in x and y):

$$\text{incoherence}(x, y) = \\ G * \left(1 + \sqrt{\left(\frac{dV_x}{dx}\right)^2 + \left(\frac{dV_x}{dy}\right)^2} + \sqrt{\left(\frac{dV_y}{dx}\right)^2 + \left(\frac{dV_y}{dy}\right)^2}\right)$$

where $V_x$ and $V_y$ are the x and y components of the offset field, respectively, and G is a Gaussian kernel. Such a measure of incoherence may be incorporated as an additional factor in the distance measure described above. Other measures of coherency may be used in other embodiments.

Figure 7A:
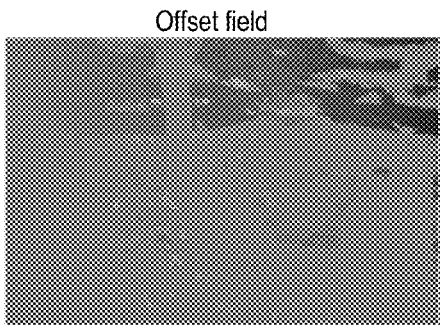
FIGS. 7A through 7D illustrate improving results using coherency analysis according to some embodiments.
Figure 7B:
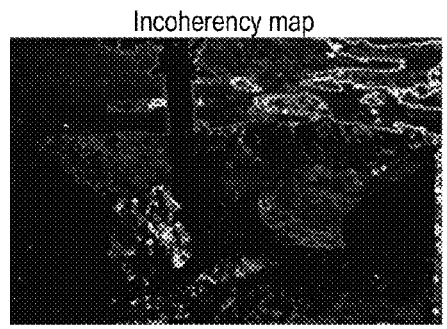
Figure 7C:
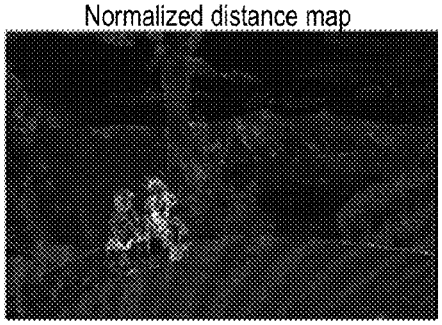
Figure 7D:
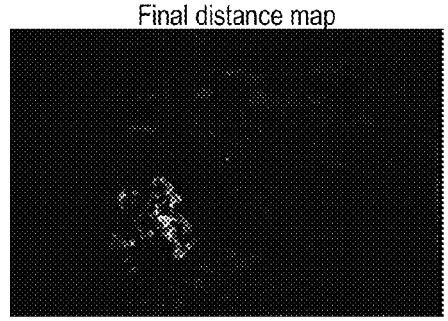

FIGS. 7A through 7D illustrate improved results using coherency analysis according to some embodiments. FIG. 7A shows an offset field. FIG. 7B shows an incoherency map obtained with the technique described above. FIG. 7C shows a distance map normalized by local contrast. And FIG. 7D shows a resultant final distance map multiplied by the incoherency map.

As indicated at 335 of method 300, an optimal crop from image A may be found. For example, to find an optimal crop, method 300 may select a crop window that contains the most error as indicated in the filtered distance map of FIG. 7D. In some embodiments, this may be implemented by applying a box filter the size of the crop window to the filtered distance map. In this case, the optimal crop may be at the same position as the global maximum of the filtered distance map. The corresponding crop in the second image may be at the same pixel position offset by the dominant offset discussed above.

Figure 8A:
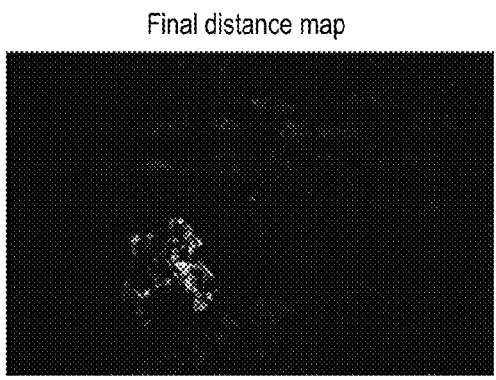
FIGS. 8A through 8C illustrate selecting optimal crops according to some embodiments.
Figure 8B:
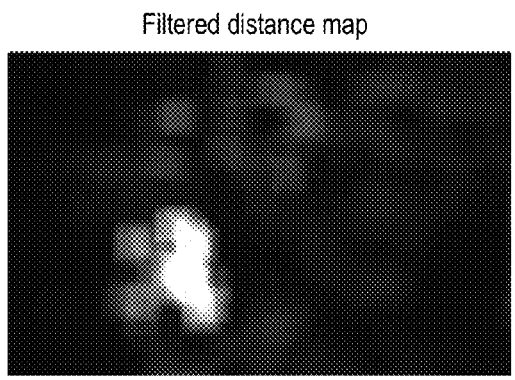
Figure 8C:
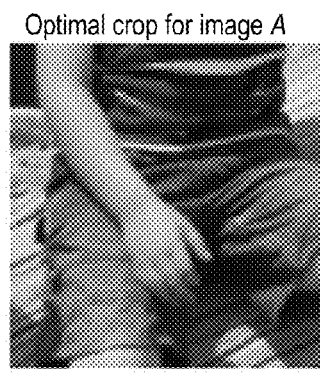
Figure 8C:
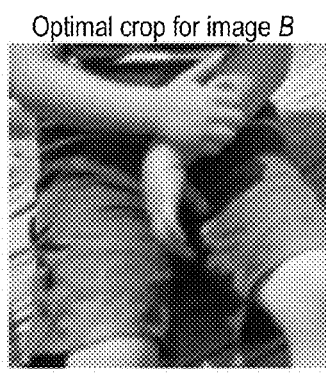

FIGS. 8A through 8C illustrate selecting crops that may be used to generate co-salient thumbnails, according to some embodiments. Particularly, FIG. 8A shows a final distance map. FIG. 8B shows a filtered distance map. And FIG. 8C shows the selected optimal crops for both images A and B. In some embodiments, an "optimal crop" may be a crop with a large corresponding peak in the filtered distance map.

As indicated at 340 of method 300, operations 310 through 335 may be repeated with the roles of image A and image B reversed (B→A). As indicated at 345, the optimal crops for image A and image B may be used to create co-salient thumbnails for the images.

It is noted that as used herein, the term "optimal" may refer to the process by which a crop or other item is generated or selected, rather than an absolute quality or characteristic of that crop or other item. That is, an "optimal" crop may refer to a crop that has been identified by a goal-seeking process that attempts to maximize or minimize some objective function or criterion, or otherwise identify some solution that satisfies an objective function or criterion.

In various embodiments, the goal-seeking process may or may not guarantee convergence to an absolute solution. For example, the goal-seeking process may exhaustively evaluate a solution space to ensure that the identified solution is the best available. Alternatively, the goal-seeking process may employ heuristic or probabilistic techniques that provide a bounded confidence interval or other measure of the quality of the solution. For example, the goal-seeking process may be designed to produce a solution that is within at least some percentage of an optimal solution, to produce a solution that has some bounded probability of being the optimal solution, or any suitable combination of these or other techniques. Thus, as used herein, an optimal selection of an item may refer to a selection that is absolutely optimal with respect to the solution space in its entirety, optimal with respect to a localized subset of a solution space, probabilistically optimal, or otherwise reflective of a goal-seeking process.

In some embodiments, method 300 may be extended to select two or more co-salient thumbnails for each image. For example, a filtered distance map may be used to find two or more crops (e.g., after finding a highest peak of co-saliency, removing a region around it and finding a second highest co-saliency point, and so on), and two or more co-salient thumbnails may be generated based on the two or more crops for a first image. Additionally or alternatively, the process may be repeated from a second image to the first image to find two or more co-salient thumbnails for the second image.

Solving for Scale

FIG. 9 is a flowchart of a method for determining a scale of a co-salient thumbnail according to some embodiments. In some embodiments, using a position solving method such as the one described in connection with one or more of operations 310 through 340 of FIG. 3, a search may be extended to searching crops at multiple scales to further refine selection of an overall pair of crops. As indicated at 910, an initial scale may be obtained as the current scale. Some embodiments may use, or generate, an image scale pyramid which may, for example, range from full resolution crops (e.g., a 100×100 pixel thumbnail corresponds to a 100×100 pixel region of the original image at full resolution) to traditional uniformly scaled thumbnails. As indicated at 915, a position solving method, such as method 300 described above, may be performed at the current scale. For example, elements 310 through 340 of FIG. 3 may be performed at the current scale. At 920, if there are more scales, then another scale is set as the current scale, as indicated at 925, and the position solving method is performed at this scale. At 920, if all scales have been processed, then results at all scales may be compared to determine an overall resultant pair of crops at 930. For example, the resultant pair may be selected according to whether they satisfy a selection criterion, such as the score criteria described above.

Each level of the scale pyramid may be fed into position solving method 300 illustrated in FIG. 3 (e.g., at element 310) and given a score based upon the quantitative value of the corresponding peak in the filtered distance map. Because the distances are computed at the same resolution as the crop, their values may be compared directly to select the overall resultant pair of crops at 940 (e.g., the pair with the highest score).

Figure 10:
FIG. 10 shows an example of a search over multiple scales with illustrative results from each level of an example scale pyramid, according to some embodiments.
Figure 11A:
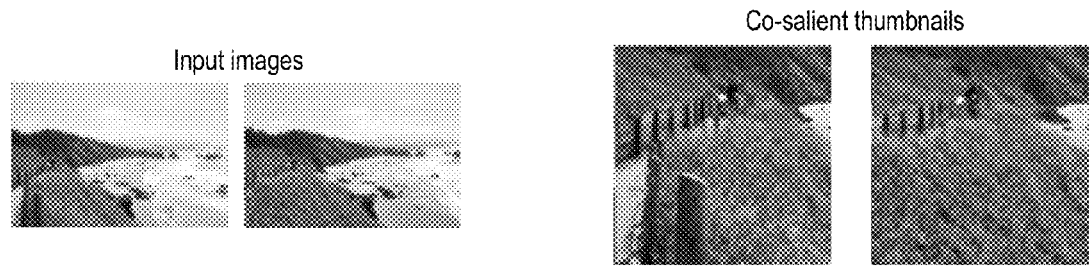
FIGS. 11A through 11D illustrate example results of a co-salient thumbnail selection method according to some embodiments.
Figure 11B:
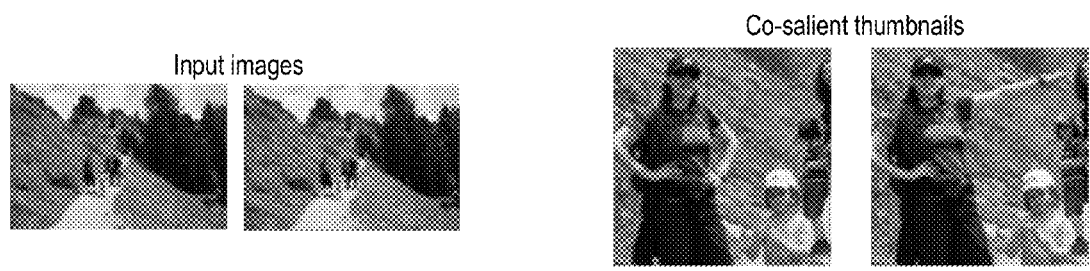
Figure 11C:
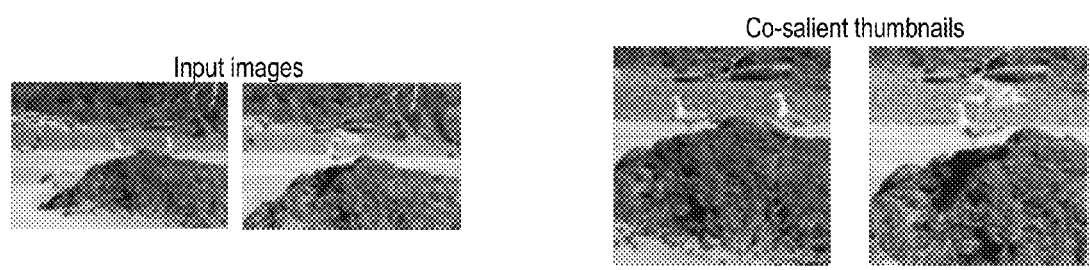
Figure 11D:
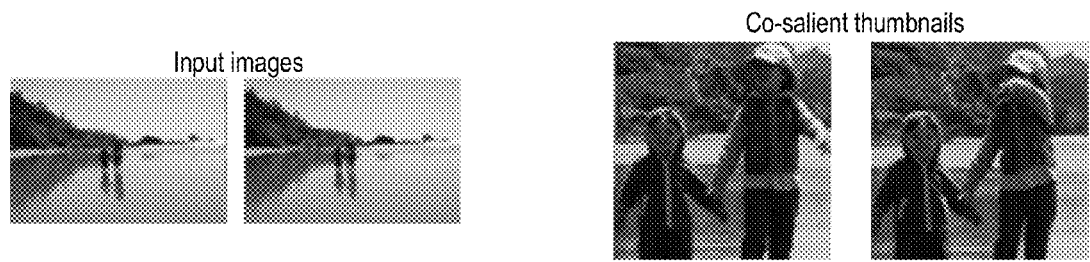

FIG. 10 illustrates an example of a search over multiple scales, and shows illustrative results from each level of a scale pyramid, according to some embodiments. The left two columns represent the optimal crops taken from image A's distance map when the position solving method was processing A→B, while the right two columns represent the optimal crops taken from image B's map when the position solving method was processing B→A. The pair of crops indicated by the black-and-white dashed rectangles have been chosen as the best overall pair of crops (i.e., the crops with the highest score).

In other embodiments, scale solving method 900 of FIG. 9 may be substituted with user input or a preset value. For example, the user may provide an indication of a desired scale, or a preference setting may indicate the desired scale.

FIGS. 11A through 11D illustrate example results of a co-salient thumbnail selection method according to some embodiments. In each of FIGS. 11A through 11D, the left two images are the input images, and the right two images are the context-sensitive, co-salient thumbnails selected by the co-salient thumbnail selection method. In some embodiments, co-salient thumbnails indicate the size of the crop relative to the entire image. For example, when displaying thumbnails to the user, text may be overlaid (or displayed in connection with) each thumbnail that indicates the scale—e.g., as a percentage (25%) or a ratio (1:4)—of the thumbnail compared to its original image. Additionally or alternatively, indirect indications of scale (e.g., thickness and/or color of a border surrounding the thumbnails) may indicate the scale. This may provide the user with information about how large the original image is compared to the thumbnail without having to view the original image. It may also provide the user with information about how similar the images are. For example, the selection of co-salient thumbnails for images having a large scale (e.g., 50%) may indicate that those images are less similar to each other than images having co-salient thumbnails having a small scale (e.g., 5%).

While FIGS. 2 through 11D generally describe selecting co-salient thumbnails for a pair of images, in some embodiments, the co-salient image selection methods may be applied to a collection of more than two images to select context-sensitive, co-salient thumbnails for the images in the collection. In one non-limiting example, a co-salient image selection method as described herein may be iteratively applied to distinct pairs of the images in a collection. Thus, if there are six images, three iterations would be performed. If there are an odd number of images, then the extra image may be compared to one of the other images to select a co-salient thumbnail for the extra image. As another example, in some embodiments, one image in a collection may be determined or selected as a base image. This selection may be performed, for example, by a user. Each of the other images may then be compared to the base image using a co-salient image selection method as described herein to select a co-salient thumbnail for the image relative to the base image. One of the crops selected for the base image in one of the iterations may be used as the thumbnail for the base image. In another non-limiting example, a method may include computing co-saliency for all pairs of images in the collection, merging the results by taking a sum or maximum value of all co-saliencies for a given image, and then using the filtered combined co-saliency to compute a thumbnail. As a person of ordinary skill in the art will recognize in light of this specification, other methods for applying a co-salient image selection method as described herein to a collection of images may be used.

FIG. 12 illustrates a thumbnail generation module that may implement one or more methods for selecting co-salient thumbnails for images as illustrated in FIGS. 2 through 11. For example, module 1200 may implement method 300 for generating co-salient thumbnails as illustrated in FIG. 3, and/or method 900 for generating co-salient thumbnails that includes solving for scale as illustrated in FIG. 9. FIG. 13 illustrates an example computer system on which embodiments of module 1200 may be implemented. Module 1200 may, for example, be implemented as or in a stand-alone application or as a module of or plug-in for an application, or as a library function. Module 1200 may receive as input a pair of similar images 1205. Module 1200 may also receive input 1210 specifying one or more thumbnail selection parameters. Thumbnail selection parameters may include, but are not limited to, thumbnail size. Module 1200 may generate as output a pair of co-salient thumbnails 1215 for the input images. Co-salient thumbnails 1215 may, for example, be stored to a storage medium 1220, such as system memory, a disk drive, DVD, CD, etc., and/or displayed on a display 1225.

In some embodiments, thumbnail selection module 1200 may provide a user interface including one or more user interface elements via which a user may interact with the module 1200, for example to specify, select, or change the value for one or more thumbnail selection parameters 1210.

Illustrative Computer System

Embodiments of a thumbnail selection module as described herein may be executed on one or more computer systems, which may interact with various other devices. One such computer system is illustrated by FIG. 13. In different embodiments, computer system 1300 may be any of various types of devices, including, but not limited to, a personal computer system, desktop computer, laptop, notebook, or netbook computer, mainframe computer system, handheld computer, workstation, network computer, a camera, a video camera, a set top box, a mobile device, a mobile phone, a consumer device, video game console, handheld video game device, application server, storage device, a peripheral device such as a switch, modem, router, or in general any type of computing or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some embodiments, it is contemplated that embodiments may be implemented using a single instance of computer system 1300, while in other embodiments multiple such systems, or multiple nodes making up computer system 1300, may be configured to host different portions or instances of embodiments. For example, in an embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

In some embodiments, at least one processor 1310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the thumbnail selection method disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1320 may be configured to store program instructions and/or data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a thumbnail selection module are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340.

In an embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, configured to implement embodiments of a thumbnail selection module as described herein, and data storage 1335, comprising various data accessible by program instructions 1325. In an embodiment, program instructions 1325 may include software elements of embodiments of a thumbnail selection module as illustrated in the above Figures. Data storage 1335 may include data that may be used in embodiments. In other embodiments, other or different software elements and data may be included.

A person of ordinary skill in the art will appreciate in light of this specification that computer system 1300 is merely illustrative and is not intended to limit the scope of a thumbnail selection module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

A person of ordinary skill in the art will also appreciate in light of this specification that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible or readable medium may include any tangible storage or memory media such as magnetic or optical media, e.g., disk or DVD/CD-ROM, volatile or non-volatile media such as RAM (e.g. SDRAM, DDR, RDRAM, SRAM, etc.), ROM, etc. The instructions and/or data may also be transmitted via transmission media or signals that are distinct from storage and memory media. For example, such signals may include electrical, electromagnetic, or digital signals, conveyed via a transmission or communication medium such as a wired network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the disclosure embrace all such modifications and changes and, accordingly, the above description to be regarded in an illustrative rather than a restrictive sense.

What is claimed is:

1. A method comprising:
   locating, for each of a plurality of patches in a first image, a corresponding similar patch in a second image based on one or more similarity measures;
   determining, by one or more computing devices, a score for each of the plurality of patches with respect to its corresponding similar patch, determining the score comprising determining one or more of a divergence metric or a distance metric;
   selecting at least one saliently different crop in the first image based at least in part on the determined scores for the plurality of patches, the saliently different crop highlighting a salient difference in the first image relative to the second image; and
   generating at least one thumbnail image for the first image based at least in part on the at least one saliently different crop.

2. The method of claim 1, wherein the divergence metric comprises a local similarity of offsets that captures a divergence of neighboring correspondence vectors or offsets.

3. The method of claim 1, wherein the method further comprises creating a distance map based at least in part on one or more of the divergence metric or the distance metric, and wherein selecting the at least one saliently different crop is based at least in part on the distance map.

4. The method of claim 3, wherein the performing by one or more computer systems further includes removing an artifact from the distance map prior to selecting the at least one saliently different crop, wherein the artifact includes one or more of a panning artifact, a rotation artifact, or a planar motion.

5. The method of claim 4, wherein the method further comprises normalizing the distance map according to a local contrast measure prior to selecting the at least one saliently different crop.

6. The method of claim 5, wherein the performing by one or more computer systems further includes emphasizing independently moving regions of at least one of the first and second images on the distance map prior to selecting the at least one saliently different crop.

7. The method of claim 1, wherein the method further comprises:
   repeating said selecting the at least one saliently different crop in the first image relative to the second image at each of a plurality of scales; and
   comparing results generated at the plurality of scales to select at least one crop from the first image and at least one crop from the second image as co-salient thumbnails for the first and second images, respectively.

8. A system, comprising:
   a processor;
   a memory comprising instructions stored thereon that, responsive to execution by the processor, perform operations comprising:
   identifying a first image and a second image;
   calculating a first distance map for each of a plurality of areas in the first image with respect to corresponding areas in the second image;
   selecting a first crop window within the first image that includes one or more areas in the first image that are farthest, in the first distance map, from their corresponding areas in the second image; and
   creating a first thumbnail image for the first image based, at least in part, on the first crop window, the first thumbnail image highlighting a salient difference in the first image relative to the second image.

9. The system of claim 8, the operations further comprising filtering the first distance map.

10. The system of claim 9, wherein filtering the first distance map comprises removing a panning artifact, said removing including:
   identifying an offset between at least a portion of the first image and at least a portion of the second image; and
   masking a region from the first distance map that is outside of an intersection between the first image and the second image based at least in part on the offset.

11. The system of claim 9, wherein filtering the first distance map comprises normalizing the distance map with respect to a local contrast, said normalizing including:
multiplying the first distance map by a measure inversely proportional to a local contrast of at least one of the first and second images.

12. The system of claim 11, wherein the measure comprises a blurred gradient magnitude of a luminance channel of at least one of the first and second images.

13. The system of claim 9, the operations further comprising:
determining an offset value for each of a plurality of pixels in the first image with respect to a corresponding pixel in the second image; and
generating an offset field based at least in part on the determined offset values.

14. The system of claim 13, wherein filtering the first distance map comprises: multiplying the first distance map by a measure of a local incoherency of the offset field.

15. The system of claim 8, wherein the selecting the first crop window within the first image comprises:
applying a filter to the first distance map; and
identifying a crop at a position within the first image that yields a high distance value in the filtered distance map.

16. The system of claim 15, wherein the high distance value is a maximum distance value.

17. The system of claim 8, the operations further comprising:
repeating at least one of said selecting operations at each of a plurality of scales.

18. The system of claim 8, the operations further comprising:
calculating a second distance map for each of a plurality of areas in the second image with respect to corresponding areas in the first image;
selecting a second crop window within the second image that includes one or more areas in the second image that are farthest, in the second distance map, from their corresponding areas in the first image; and
creating a second thumbnail image for the second image based, at least in part, on the second crop window.

19. A non-transitory computer-readable storage medium having instructions stored thereon that, upon execution by a computer system, cause the computer system to perform operations comprising: identifying a first image and a second image;
determining, for a first area within the first image, a first corresponding area within the second image;
calculating a first distance between the first area and the first corresponding area;
determining, for a second area within the first image, a second corresponding area within the second image;
calculating a second distance between the second area and the second corresponding area;
selecting the first area in response to the first distance being greater than the second distance; and
creating a thumbnail image for the first image based, at least in part, on the selected area, the thumbnail image for the first image highlighting a salient difference in the first image relative to the second image.

20. The non-transitory computer-readable storage medium of claim 19, wherein the operations further comprise:
selecting the second area in response to the second distance being greater than the first distance.

21. The non-transitory computer-readable storage medium of claim 19, wherein the operations further comprise:
determining, for a third area within the second image, a third corresponding area within the first image;
calculating a third distance between the third area and the third corresponding area;
determining, for a fourth area within the second image, a fourth corresponding area within the first image;
calculating a fourth distance between the fourth area and the fourth corresponding area;
selecting the third area in response to the third distance being greater than the fourth distance; and
creating a thumbnail image for the second image based, at least in part, on the selected area.

22. The non-transitory computer-readable storage medium of claim 21, wherein the operations further comprise:
selecting the fourth area in response to the fourth distance being greater than the third distance.

* * * * *